United States Patent
Shibata

(10) Patent No.: US 11,673,266 B2
(45) Date of Patent: Jun. 13, 2023

(54) ROBOT CONTROL DEVICE FOR ISSUING MOTION COMMAND TO ROBOT ON THE BASIS OF MOTION SEQUENCE OF BASIC MOTIONS

(71) Applicant: OMRON Corporation, Kyoto (JP)

(72) Inventor: Yoshiya Shibata, Tokyo (JP)

(73) Assignee: OMRON Corporation, Kyoto (JP)

(*) Notice: Subject to any disclaimer, the term of this patent is extended or adjusted under 35 U.S.C. 154(b) by 410 days.

(21) Appl. No.: 16/977,472

(22) PCT Filed: Feb. 20, 2019

(86) PCT No.: PCT/JP2019/006182
§ 371 (c)(1),
(2) Date: Sep. 2, 2020

(87) PCT Pub. No.: WO2019/176477
PCT Pub. Date: Sep. 19, 2019

(65) Prior Publication Data
US 2021/0046649 A1    Feb. 18, 2021

(30) Foreign Application Priority Data
Mar. 14, 2018    (JP) .............. JP2018-047257

(51) Int. Cl.
   *B25J 9/16*    (2006.01)
(52) U.S. Cl.
   CPC ............. *B25J 9/1664* (2013.01); *B25J 9/163* (2013.01)
(58) Field of Classification Search
   CPC .............. B25J 9/1664; B25J 9/163; G05B 2219/39271
   See application file for complete search history.

(56) References Cited

U.S. PATENT DOCUMENTS 5,231,693 A * 7/1993 Backes ................ B25J 9/1661
                                                318/568.1
2010/0023164 A1 * 1/2010 Yoshizawa ............ B25J 9/1664
                                                901/50
(Continued)

FOREIGN PATENT DOCUMENTS

| CN | 1460050 | 12/2003 |
| CN | 106203050 | 12/2016 |

(Continued)

OTHER PUBLICATIONS

Skoglund, A., et al., "Programming by Demonstration of Pick-and-Place Tasks for Industrial Manipulators using Task Primitives," Jun. 2007, IEEE, 2007 IEEE International Symposium on Computational Intelligence in Robotics and Automation, pp. 368-373 (Year: 2007).*

"Office Action of Japan Counterpart Application", dated Oct. 27, 2020, with English translation thereof, p. 1-p. 6.

(Continued)

*Primary Examiner* — Abby Y Lin
*Assistant Examiner* — Karston G. Evans
(74) *Attorney, Agent, or Firm* — JCIPRNET

(57) ABSTRACT

This control device for controlling the motion of a robot comprises a first processing part and a command part. The first processing part sets a first state of the robot and a second state to which the robot transitions from the first state as inputs, and sets at least one basic motion selected from a plurality of basic motions the robot is instructed to perform for transitioning from the first state to the second state and the order in which the basic motions are to be performed as outputs. Prescribed operating parameters are set for each of the basic motions. The command part executes motion commands for the robot on the basis of the output from the first processing part.

14 Claims, 7 Drawing Sheets

(56) References Cited

U.S. PATENT DOCUMENTS

| | | | |
|---|---|---|---|
| 2016/0288323 A1* | 10/2016 | Mühlig | B25J 9/163 |
| 2016/0309339 A1 | 10/2016 | Priest et al. | |
| 2017/0274534 A1* | 9/2017 | Takahashi | B25J 9/1697 |
| 2017/0334066 A1* | 11/2017 | Levine | B25J 9/1656 |
| 2017/0348854 A1* | 12/2017 | Oleynik | B25J 9/16 |
| 2019/0184561 A1* | 6/2019 | Yip | G06N 5/046 |
| 2019/0321974 A1* | 10/2019 | Leon | B25J 9/1661 |
| 2021/0046648 A1* | 2/2021 | Schmitt | B25J 9/1671 |
| 2021/0154840 A1* | 5/2021 | Vogel | B25J 9/1666 |

FOREIGN PATENT DOCUMENTS

| | | |
|---|---|---|
| CN | 106313052 | 1/2017 |
| CN | 107263464 | 10/2017 |
| JP | S61264406 | 11/1986 |
| JP | S6272004 | 4/1987 |
| JP | H10124130 | 5/1998 |
| JP | 2007018490 | 1/2007 |
| JP | 2008112266 | 5/2008 |
| JP | 2009066692 | 4/2009 |
| WO | 2017134735 | 8/2017 |
| WO | 2017151926 | 9/2017 |

OTHER PUBLICATIONS

Matthias Rungger et al., "Multiscale Anticipatory Behavior by Hierarchical Reinforcement Learning," Anticipatory Behavior in Adaptive Learning Systems: From Psychological Theories to Artificial Cognitive Systems, Jun. 2009, pp. 301-320.

Alessandro Settimi et al., "Motion Primitive Based Random Planning for Loco-Manipulation Tasks," 2016 IEEE-RAS 16th International Conference on Humanoid Robots (Humanoids), Nov. 2016, pp. 1059-1066.

H. Terasaki et al., "Motion Planning of Intelligent Manipulation by a Parallel Two-Fingered Gripper Equipped With a Simple Rotating Mechanism," IEEE Transactions on Robotics and Automation, vol. 14, Apr. 1998, pp. 207-219.

"Search Report of Europe Counterpart Application", dated Jan. 24, 2022, p. 1-p. 12.

"International Search Report (Form PCT/ISA/210) of PCT/JP2019/006182", dated Apr. 23, 2019, with English translation thereof, pp. 1-3.

"Written Opinion of the International Searching Authourity (Form/ISA/237) of PCT/JP2019/006182", dated Apr. 23, 2019, with English translation thereof, p. 1-p. 6.

"Office Action of China Counterpart Application", dated Mar. 1, 2023, with English translation thereof, p. 1-p. 15.

* cited by examiner

ROBOT CONTROL DEVICE FOR ISSUING MOTION COMMAND TO ROBOT ON THE BASIS OF MOTION SEQUENCE OF BASIC MOTIONS

CROSS-REFERENCE TO RELATED APPLICATION

This application is a 371 application of the international PCT application serial no. PCT/JP2019/006182, filed on Feb. 20, 2019, which claims the priority benefit of Japan application no. 2018-047257, filed on Mar. 14, 2018. The entirety of each of the above-mentioned patent applications is hereby incorporated by reference herein and made a part of this specification.

TECHNICAL FIELD

The present disclosure relates to a control device, a control method, a control program, and a processing device for a robot.

BACKGROUND ART

When a person prepares a control system for a robot as a whole, there is a problem in that it takes time to finely adjust parameters. On the other hand, a plan of a motion sequence of a robot from a current state to a target state is determined by machine learning (for example, Patent Literature 1).

CITATION LIST

Patent Literature

Patent Literature 1: Japanese Patent Laid-open No. 2007-18490

SUMMARY OF INVENTION

Technical Problem

However, when machine learning is employed as described above, there are the following problems. For example, when it is intended to determine a complex motion sequence using one large learned model such as a neural network, there is a problem in that learning takes a time. In a learned model, since a user cannot understand meanings of internal parameters such as a weight, there is a problem in that the user cannot adjust a result of learning even when the user wants to partially change the result of learning.

These problems are not limited to a control device for a robot but can be caused in all processing devices that achieve an objective by performing a predetermined process out of a plurality of candidates.

The present disclosure is made to solve the above-mentioned problems and an objective thereof is to provide a control device, a control method, a control program, and a processing device for a robot that can achieve enhancement in efficiency of processes.

Solution to Problem

According to the present disclosure, there is provided a control device for a robot that controls a motion of the robot, the control device for the robot including: a first processing part configured to set a first state of the robot and a second state to which the first state transitions as inputs and set at least one basic motion selected out of a plurality of basic motions which are performed by the robot for transition from the first state to the second state and a motion sequence of the basic motions as outputs, a predetermined motion parameter being set for each of the basic motions; and a command part configured to issue a motion command to the robot on the basis of the output from the first processing part.

With this configuration, instead of acquiring the output of the processing part from all motions of a robot, since a predetermined number of basic motions are prepared in advance and the first processing part performs a process of selecting optimal basic motions therefrom and a sequence thereof, it is possible to shorten a calculation time for processing. Since the basic motions are determined in advance, a user can easily understand a motion of the robot by watching a combination of the basic motions. Since the motion parameter is set for each basic motion, a user can arbitrarily change the motion parameter of each basic motion after the basic motion has been determined.

The first state and the second state of the robot include a state of a work object of the robot in addition to the state of the robot itself.

The control device may further include a second processing part configured to set the first state and the second state as inputs and set the motion parameter of each of the basic motions selected as the output of the first processing part for transition from the first state to the second state as outputs, and the command part may be configured to issue the motion command to the robot on the basis of the outputs from the first processing part and the second processing part.

With this configuration, since adjustment of the basic motions, that is, adjustment of the motion parameters, can be automatically performed, it is possible to improve accuracy in achieving the second state.

In the control device, when the robot is not able to transition to the second state using a predetermined criterion depending on the output from the first processing part, the second processing part may be configured to output the motion parameter.

In the control device, the motion parameter may be output within a predetermined range. Accordingly, it is possible to narrow a search range and to shorten a processing time.

The control device may further include a reception part configured to receive adjustment of the motion parameter of each of the basic motions. Accordingly, a user can arbitrarily adjust the motion parameters.

The control device may further include an input part configured to receive designation of the second state.

In the control device, the first processing part may be constituted by a learned learning machine.

According to the present disclosure, there is provided a control system for the robot, the control system including the robot and the above-mentioned control device for the robot, wherein the robot is configured to transition from the first state to the second state in accordance with the motion command from the control device.

According to the present disclosure, there is provided a control method for a robot that controls a motion of the robot, the control method for the robot including steps as follows: preparing for a first processing part to set a first state of the robot and a second state to which the first state transitions as inputs and set at least one basic motion selected out of a plurality of basic motions which are performed by the robot for transition from the first state to the second state and a motion sequence of the basic motions as outputs, a predetermined motion parameter being set for each of the basic motions; inputting the first state and the second state to the first processing part and outputting the at least one basic motion and the motion sequence of the basic motions; and issuing a motion command to the robot on the basis of the output from the first processing part.

According to the present disclosure, there is provided a control program that controls a motion of a robot, the control program causing a computer to perform steps as follows: preparing for a first processing part to set a first state of the robot and a second state to which the first state transitions as inputs and set at least one basic motion selected out of a plurality of basic motions which are performed by the robot for transition from the first state to the second state and a motion sequence of the basic motions as outputs, a predetermined motion parameter being set for each of the basic motions; inputting the first state and the second state to the first processing part and outputting the at least one basic motion and the motion sequence of the basic motions; and issuing a motion command to the robot on the basis of the output from the first processing part.

According to the present disclosure, there is provided a processing device that processes a processing object, the processing device including: a first processing part configured to set a first state of the processing object and a second state to which the first state transitions as inputs and set at least one basic process selected out of a plurality of basic processes which are performed on the processing object for transition from the first state to the second state and a process sequence of the basic processes as outputs, a predetermined process parameter being set for each of the basic processes; and a command part configured to perform processes on the processing object on the basis of the output from the first processing part.

The processing device may further include a second processing part configured to set the first state of the processing object and the second state to which the first state transitions as inputs and set the process parameter of each of the basic processes selected as the output of the first processing part for transition from the first state to the second state, and the command part may be configured to process the processing object on the basis of the outputs from the first processing part and the second processing part.

In the processing device, when the processing object is not able to transition to the second state using a predetermined criterion depending on the output from the first processing part, the second processing part may be configured to output the process parameter.

In the processing device, the process parameter may be output within a predetermined range.

In the processing device, the plurality of basic processes may be a filtering process which is performed on an image.

Advantageous Effects of Invention

According to the present disclosure, it is possible to shorten a processing time for determining optical processes and to easily adjust the processes.

DESCRIPTION OF EMBODIMENTS

Hereinafter, an embodiment of a control device, a control method, and a control program for a robot according to the present disclosure will be described with reference to the accompanying drawings. The embodiment which will be described below is merely an example of the present disclosure in all respects. The embodiment can be improved or modified in various forms without departing from the scope of the present disclosure. That is, specific constituents of the embodiment may be appropriately employed for embodying the present disclosure. Data which is mentioned in the embodiment is described in a natural language, but is more specifically designated in pseudo languages, commands, parameters, machine languages, and the like which can be recognized by a computer.

<1. Application>

Figure 1:
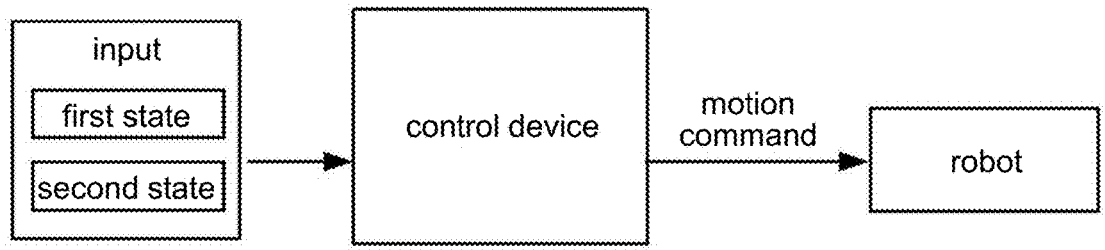
FIG. 1 is a block diagram schematically illustrating an embodiment of a control device for a robot according to the present disclosure.

A control device for a robot according to the embodiment will be described below. As illustrated in FIG. 1, the control device sets a first state and a second state as inputs in causing a robot to transition from the first state to the second state and sets at least one basic motion which is performed by the robot and a motion sequence thereof as outputs. This outputting is performed by a learning machine.

Figure 2:
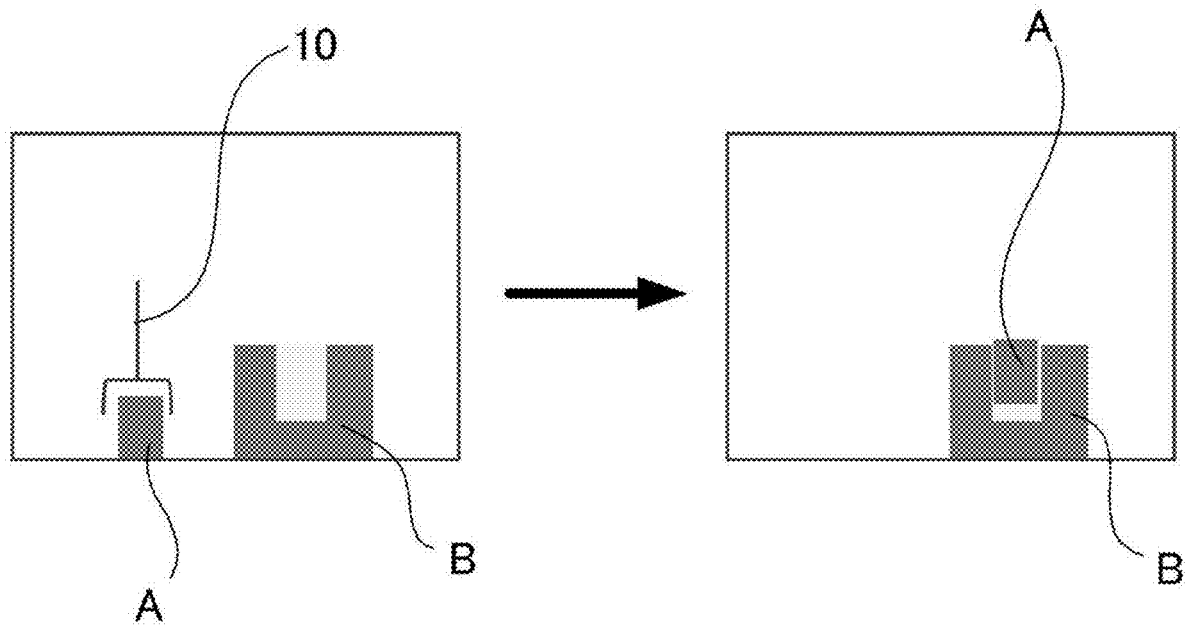
FIG. 2 is a diagram illustrating an initial state and a target position of a work object of a robot.

For example, as illustrated in FIG. 2, it is assumed that a robot performs transition from an initial state in which a component A having a rectangular parallelepiped shape and a component B having a recess into which the component A is fitted are disposed apart from each other to a target state in which the component A has been fitted into the recess of the component B.

In order for a robot 10 to move the component A from the initial state to the target state, various motions and various motion sequences are considered. However, when all motions are considered, much time may be taken for calculation. Therefore, in this embodiment, movement of the component A is performed by setting candidates of the motions which are performed by the robot 10 as motion primitives (basic motions) in advance and performing the motion primitives selected therefrom in a predetermined sequence. A motion primitive is an individual element when a motion which can be performed by the robot 10 is expressed by a predetermined number of elements. For example, when the robot 10 moves horizontally and then moves downward at the time of transportation of a component, the horizontal movement and the downward movement are motion primitives.

Figure 3:
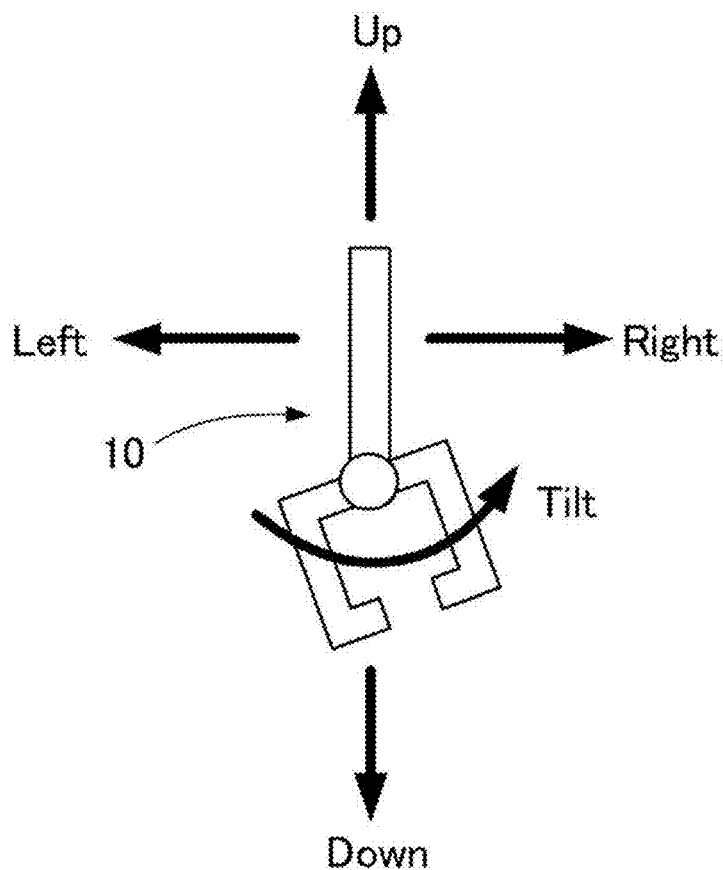
FIG. 3 is a diagram illustrating a motion of a robot.

As illustrated in FIG. 3, in this embodiment, it is assumed that the robot 10 performs five motions including upward movement (Up), downward movement (Down), rightward movement (Right), leftward movement (Left), and tilt (Tilt) and it is assumed that some of the five motions are combined to fit the component A into the component B. In this embodiment, for the purpose of convenience of explanation, it is assumed that movement in a direction perpendicular to the drawing surface is not considered. However, movement in such a direction may be included depending on work details of the robot 10.

Figure 4:
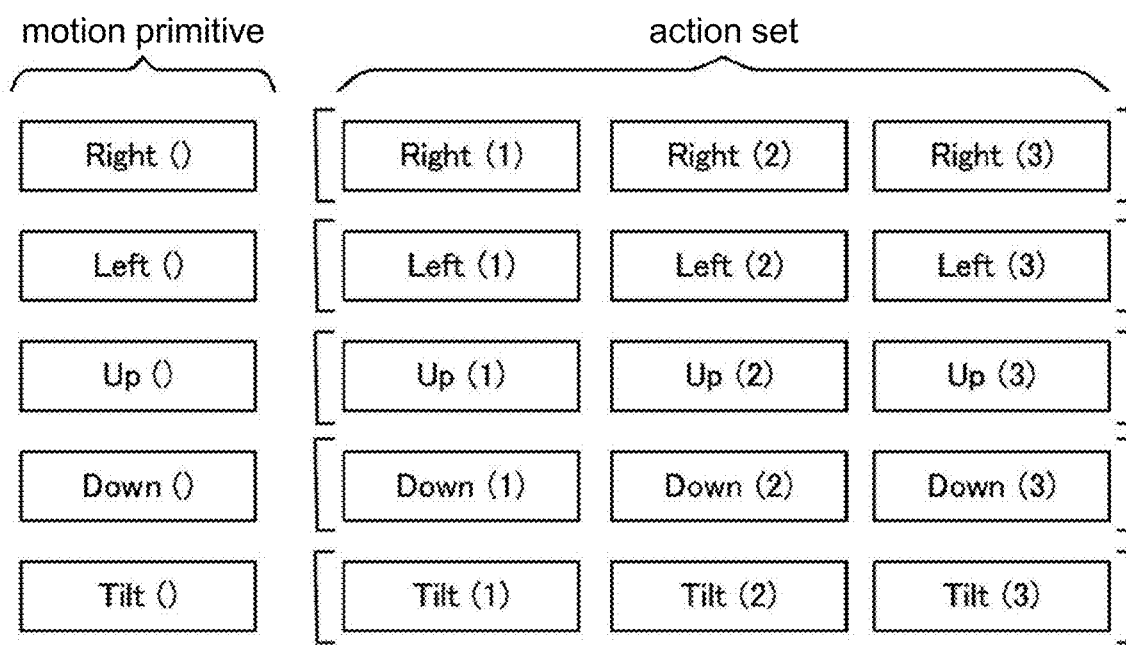
FIG. 4 is a diagram illustrating an example of motion primitives.

As illustrated in FIG. 4, in this embodiment, the five motions are set as the motion primitives and an amount of movement is set for each motion primitive. This is referred to as an action set. In the example illustrated in FIG. 4, three action sets are set for each motion primitive. For example, Right(1), Right(2), and Right(3) mean that the amounts of rightward movement are 1, 2, and 3, respectively. In the following description, each amount of movement (or a tilt angle) is referred to as a motion parameter. A motion parameter indicates an aspect/degree of a motion which is expressed by motion primitives and is not limited to an amount of movement or angle. An action set is a combination of a motion primitive and a motion parameter and can be said to be a series of motion. Here, sets in which the amounts of movement which are motion parameters are 1, 2, and 3 are described as action sets, but the present disclosure is not limited thereto. For example, when combinations of motion parameters are defined as P1, P2, P3, . . . , Pn, these may be combinations having regularity such as an arithmetical progression or a geometric progression.

As described above, in this embodiment, motion primitives which are used for movement of the component A and a sequence thereof are determined out of 15 types of motion primitives to include a plurality of action sets. That is, when the initial states and the target states of the component A and the component B are used as inputs, the learning machine operates such that optimal motion primitives which are performed by the robot 10 and a motion sequence thereof are output.

Figure 5:
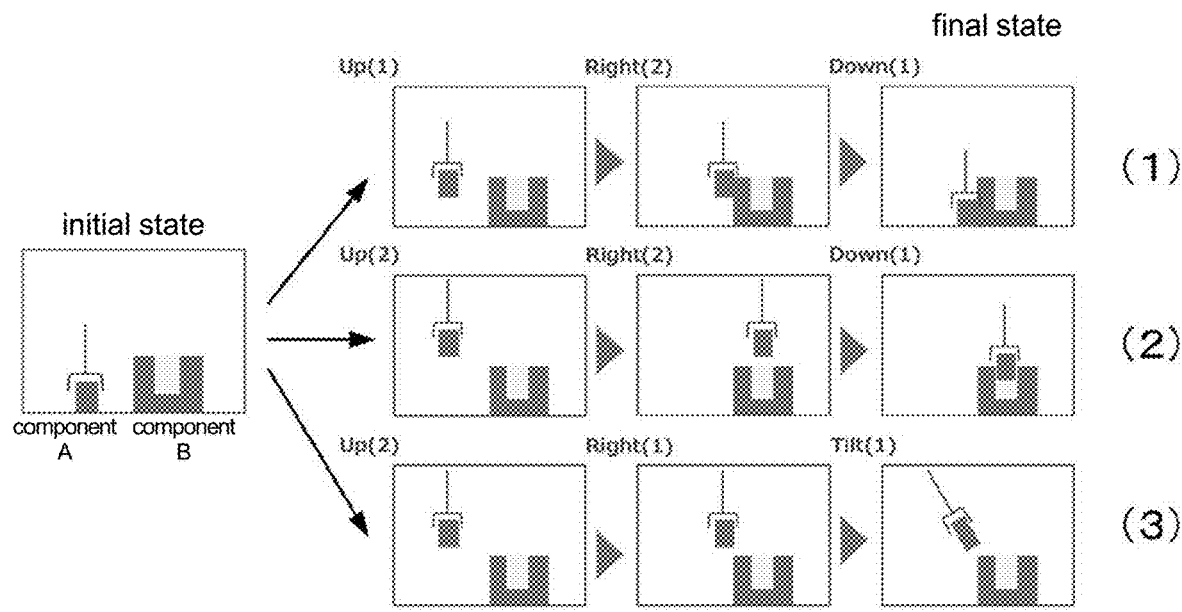
FIG. 5 is a diagram illustrating an example of a motion of a robot based on motion primitives.

The motion of the robot 10 is evaluated as follows to perform an optimal output from the learning machine. For example, as illustrated in FIG. 5, a plurality of combinations of motion primitives is considered for the motion of the robot 10. Here, three types of combinations of motion primitives are exemplified. As the result of three robot motions (1) to (3), the final states of the component A and the component B are different, and the robot motions are evaluated by comparing these final states with the target state.

For example, a position vector of the component A in the target state and a position vector of the component A in the final state are compared with each other and an evaluation value is calculated from a difference therebetween. In this example, a position vector is defined as V (right and left positions, upper and lower positions, tilt), a position vector in a target state is defined as Vg, and a position vector in a final state is defined as Ve. Then, an evaluation value is calculated by the following expression.

Evaluation value=1−|Ve−Vg|/K (Here, K denotes a coefficient for normalizing the evaluation value to be between 0 and 1. Accordingly, for example, K can be set such that the evaluation value in an ideal state approaches 1 and the evaluation value becomes 0 when it exceeds an allowable tolerance.)

Figure 6:
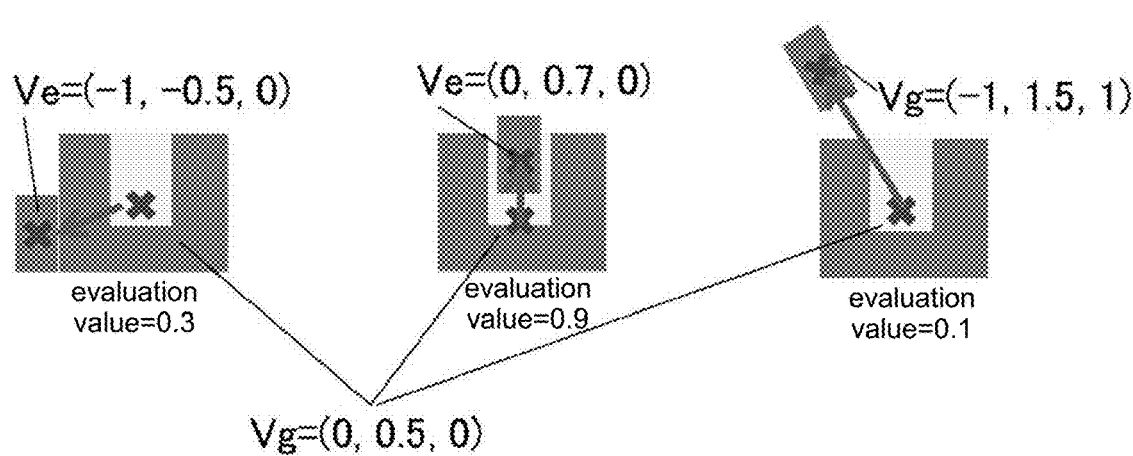
FIG. 6 is a diagram illustrating an evaluation method of a motion of a robot.

For example, evaluation values for the three motions (1) to (3) of the robot 10 can be calculated as illustrated in FIG. 6. In this example, the evaluation value in the final state of the component A through the motion (2) is the highest. That is, the component A is located at a position closest to the target state. Accordingly, the learning machine is made to learn such that it outputs the motion primitives for acquiring such a high evaluation value and a sequence thereof.

The evaluation value of the motion (2) is not 1.0 (perfect score) and the component A is not completely fitted into the recess of the component B as illustrated in FIG. 6. Accordingly, there is room for improvement in the motion of the robot 10. In FIG. 6, for example, it is thought that the component A can be completely fitted into the recess of the component B by correcting the motion parameter of Down (1) which is the final motion of the motion (2) from 1. Therefore, in this embodiment, when the purpose is not completely achieved by only the prepared motion primitives, the motion parameters of the motion primitives may be adjusted.

Figure 7:
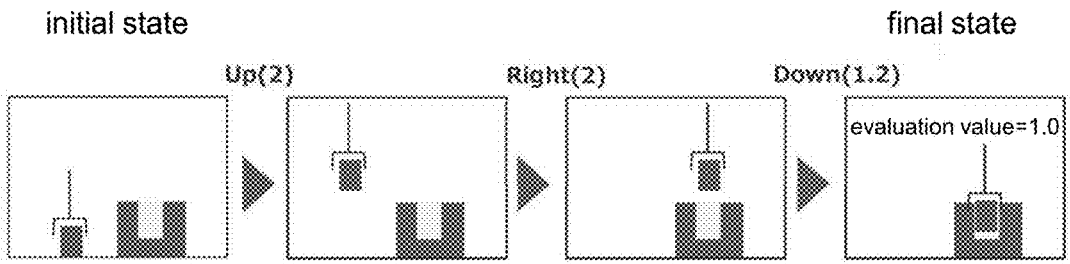
FIG. 7 is a diagram illustrating adjustment of a motion parameter.

For example, when the motion parameter of the final motion primitive of the motion (2) is changed from 1 to 1.2 as illustrated in FIG. 7, the evaluation value becomes 1.0 and the final state can be made the target state. Here, there are various methods of adjusting the motion parameters, and the motion parameters may be randomly changed after the motion primitives and the sequence thereof have been determined and an optimal value may be searched for or an optimal value may be determined using the learning machine.

This adjustment of the motion parameters can be performed on the basis of a user's intention. Accordingly, after motion primitives close to an optimal motion have been acquired, a user can manually adjust the robot motion.

<2. Example of Configuration>
<2-1. Hardware Configuration>

Figure 8:
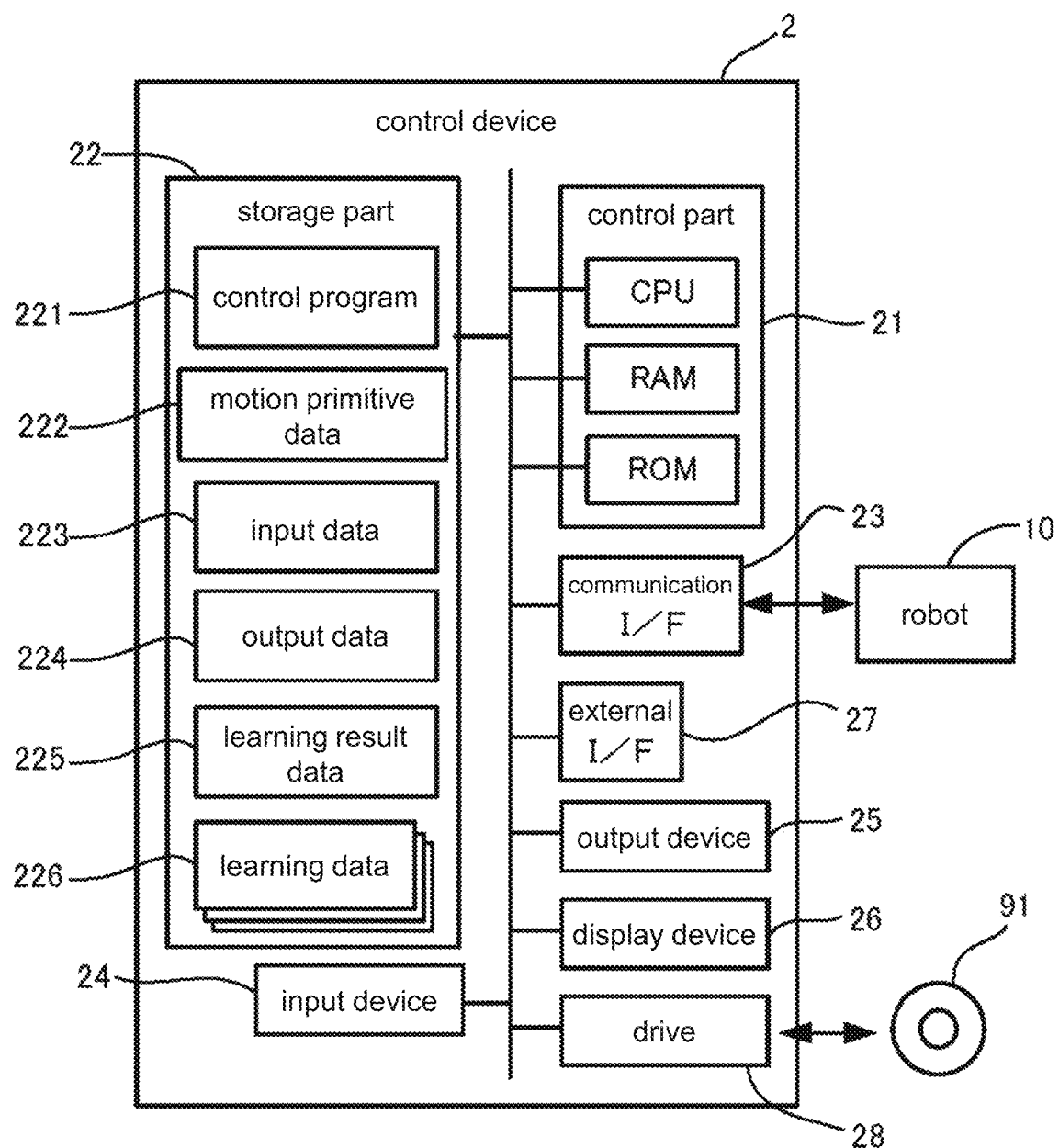
FIG. 8 is a block diagram illustrating a hardware configuration of the control device illustrated in FIG. 1.

A hardware configuration of the control device for a robot according to this embodiment will be first described with reference to FIG. 8. FIG. 8 is a block diagram illustrating the hardware configuration of the control device for a robot according to this embodiment.

<2-1-1. Robot>

As illustrated in FIG. 3, the robot 10 includes an arm that can grasp a component and is configured such that the arm moves upward, downward, rightward, and leftward and the arm is tilted. The configuration of the robot is not particularly limited and can be appropriately changed to perform other motions.

<2-1-2. Control Device >

As illustrated in FIG. 8, the control device 2 for a robot according to this embodiment is a computer in which a control part 21, a storage part 22, a communication interface 23, an input device (an input part, a reception part) 24, an output device 25, a display device 26, an external interface 27, and a drive 28 are electrically connected to each other. In FIG. 1, the communication interface and the external interface are referred to as a "communication I/F" and an "external I/F," respectively.

The control part 21 includes a central processing unit (CPU), a random access memory (RAM), a read only memory (ROM) and controls the elements according to information processing. The storage part 22 is, for example, an auxiliary storage device such as a hard disk drive or a solid state drive and stores a control program 221 which is executed in the control part 21, motion primitive data 222, input data 223, output data 224, learning result data 225 indicating information on a learning machine which has learned, learning data 226 for causing the learning machine to learn, and the like. In addition, the storage part 22 may store various types of data required for driving the control device.

The control program 221 serves to receive the above-mentioned inputs for a robot motion and to perform outputs based thereon and performs the outputs using a learning machine which will be described later. The motion primitive data 222 is set in advance depending on the type of the robot 10 or a type of work required as illustrated in FIG. 4. The input data 223 is data including an initial state and a target state of the above-mentioned components, and the output data 224 is data indicating a motion of the robot 10 which is output from the learning machine. The learning result data 225 is data which is used to set the learning machine which has learned. The learning data 226 is data which was used for learning of the current learning machine. Details of learning will be described later.

The communication interface 23 is, for example, a wired local area network (LAN) module or a wireless LAN module and is an interface for performing wired or wireless communication via a network. For example, the communication interface 23 is used to communicate with the robot 10 or to transmit information on control of the robot 10 to the outside. The input device 24 is a device that performs inputting such as a mouse or a keyboard and can input various instructions from a user in addition to inputting of the input data 223. The output device 25 is a device that performs outputting such as a speaker. The display device 26 is constituted by a display or the like and can display, for example, a result of outputting from the learning machine. The external interface 27 is a universal serial bus (USB) or the like and is an interface for connection to an external device.

A drive 28 is a device that reads a program stored in a storage medium 91, such as a compact disk (CD) drive or a digital versatile disk (DVD) drive. The type of the drive 28 may be appropriately selected according to the type of the storage medium 91. At least one of various types of data 222 to 226 stored in the storage part 22 may be stored in the storage medium 91. The input data 223 and the output data 224 may be stored in the RAM of the control part 21.

The storage medium 91 is a medium which can store information such as programs through an electrical, magnetic, optical, mechanical, or chemical action such that the stored information such as programs can be read by a computer, another device, a machine, or the like. The control device 2 may acquire various types of data 222 to 226 from the storage medium 91.

Here, FIG. 8 illustrates a disk type storage medium such as a CD or a DVD as an example of the storage medium 91. However, the type of the storage medium 91 is not limited to the disk type and may be a type other than the disk type. Examples of the storage medium other than the disk type include a semiconductor memory such as a flash memory.

Regarding the specific hardware configuration of the control device 2, omission, replacement, and addition of elements can be appropriately performed depending on embodiments. For example, the control part 21 may include a plurality of processors. The control device 2 may be constituted by a plurality of information processing devices. A general-purpose desktop personal computer (PC), a tablet PC, or the like other than an information processing device which is designed to be dedicated for a service which is provided may be used as the control device 2.

<2-2. Functional Configuration of Control Device>

Figure 9:
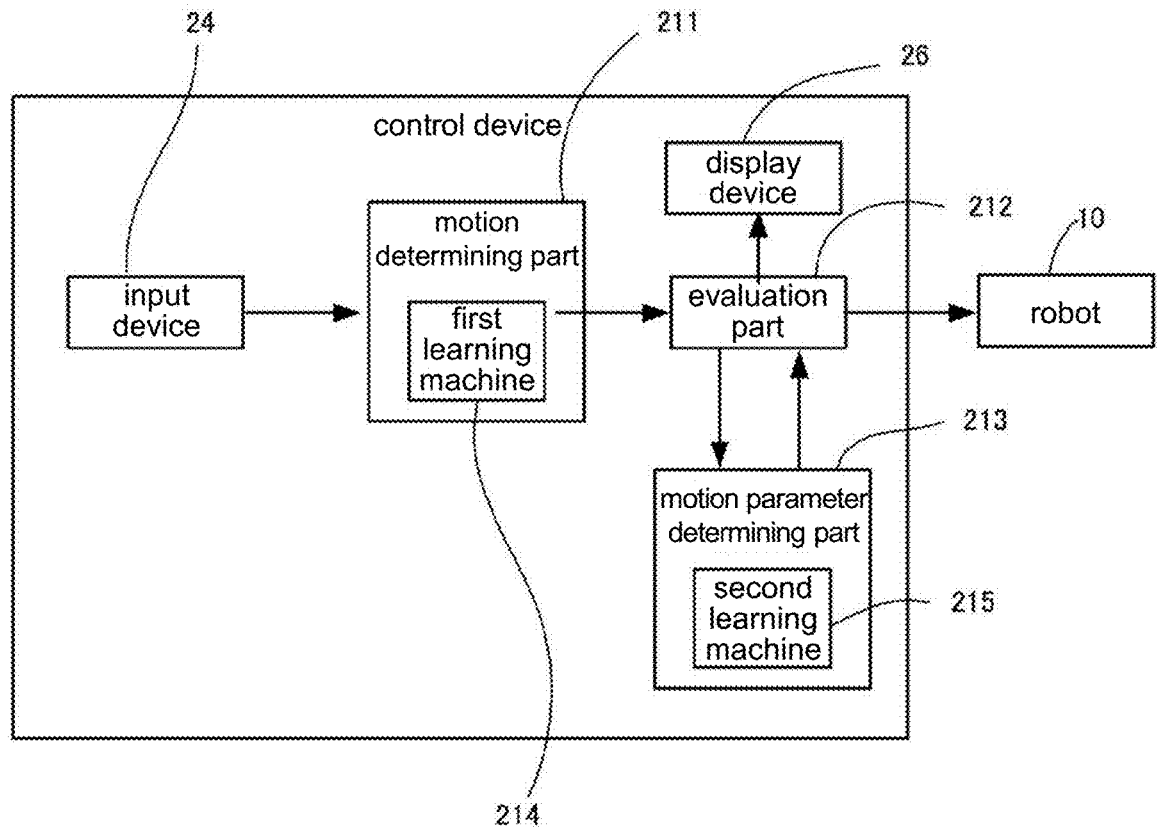
FIG. 9 is a block diagram illustrating a functional configuration of the control device illustrated in FIG. 1.

An example of a functional configuration of a control system according to this embodiment will be described below with reference to FIGS. 8 and 9. FIG. 9 is a block diagram illustrating a functional configuration of the control device.

<2-2-1. Rough Configuration>

The control part 21 of the control device 2 loads the control program 221 stored in the storage part 22 into the RAM. Then, the control part 21 controls the elements by causing the CPU to analyze and execute the program 221 loaded into the RAM. Accordingly, as illustrated in FIG. 9, the control device 2 according to this embodiment serves as a computer including a motion determining part 211, an evaluation part 212, and a motion parameter determining part 213.

<2-2-2. Motion Determining Part>

As described above, the motion determining part 211 takes input data including an initial state and a target state of a component as an input as illustrated in FIG. 2. This input data is input from the input device 24 and various input methods can be used. For example, coordinates and position vectors of the initial state and the target state may be input or may be selected from initial states and target states which are set in advance. Alternatively, images of the initial state and the target state may be acquired and be input.

The motion determining part 211 includes a first learning machine 214 that determines a motion of the robot 10 from the input data. The output of the first learning machine 214 includes at least one motion primitive and a motion sequence. That is, the first learning machine 214 has been made to learn such that motion primitives of which the above-mentioned evaluation value is high and a sequence thereof are output out of a plurality of preset motion primitives.

The learning machine 214 that performs such outputting is constituted by a neural network. Specifically, as illustrated in FIG. 10, the neural network is a neural network with a multilayered structure which is used for so-called deep learning and includes an input layer 71, an intermediate layer (a hidden layer) 72, and an output layer 73 sequentially from the input.

Figure 10:
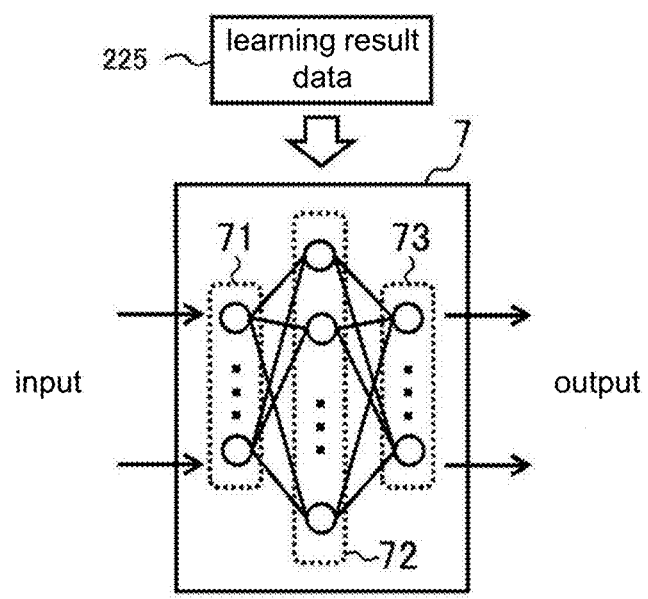
FIG. 10 is a diagram illustrating an example of a neural network which is used in the control device illustrated in FIG. 1.

In FIG. 10, the neural network 7 includes one intermediate layer 72, where an output of the input layer 71 is an input of the intermediate layer 72 and an output of the intermediate layer 72 is an input of the output layer 73. The number of intermediate layers 72 is not limited to one and the neural network 7 may include two or more intermediate layers 72.

The layers 71 to 73 include one or more neurons. For example, the number of neurons of the input layer 71 can be set depending on the number of pieces of input data. The number of neurons of the intermediate layer 72 can be appropriately set depending on embodiments. The number of neurons of the output layer 73 can also be set depending on the number of motion primitives.

The neurons of neighboring layers are appropriately coupled and a weighting (a coupling load) is set for each coupling. In the example illustrated in FIG. 4, each neuron is coupled to all neurons of neighboring layers and coupling between neurons is not limited to this example and may be appropriately set depending on embodiments.

A threshold value is set for each neuron and an output of each neuron is determined depending on whether a sum of squares of each input and each weighting is greater than the threshold value. The control device 2 acquires output data indicating an optimal motion of the robot from the output layer 73 by inputting the input data to the input layer 71 of the neural network 7.

Information indicating the configuration of the neural network 7 (for example, the number of layers of the neural network 7, the number of neurons of each layer, a coupling relationship between neurons, and a transfer function of each neuron), weightings of coupling between the neurons, and the threshold value of each neuron is included in the learning result data 225. The control device 2 sets a learning machine which has learned with reference to the learning result data 225.

Figure 11:
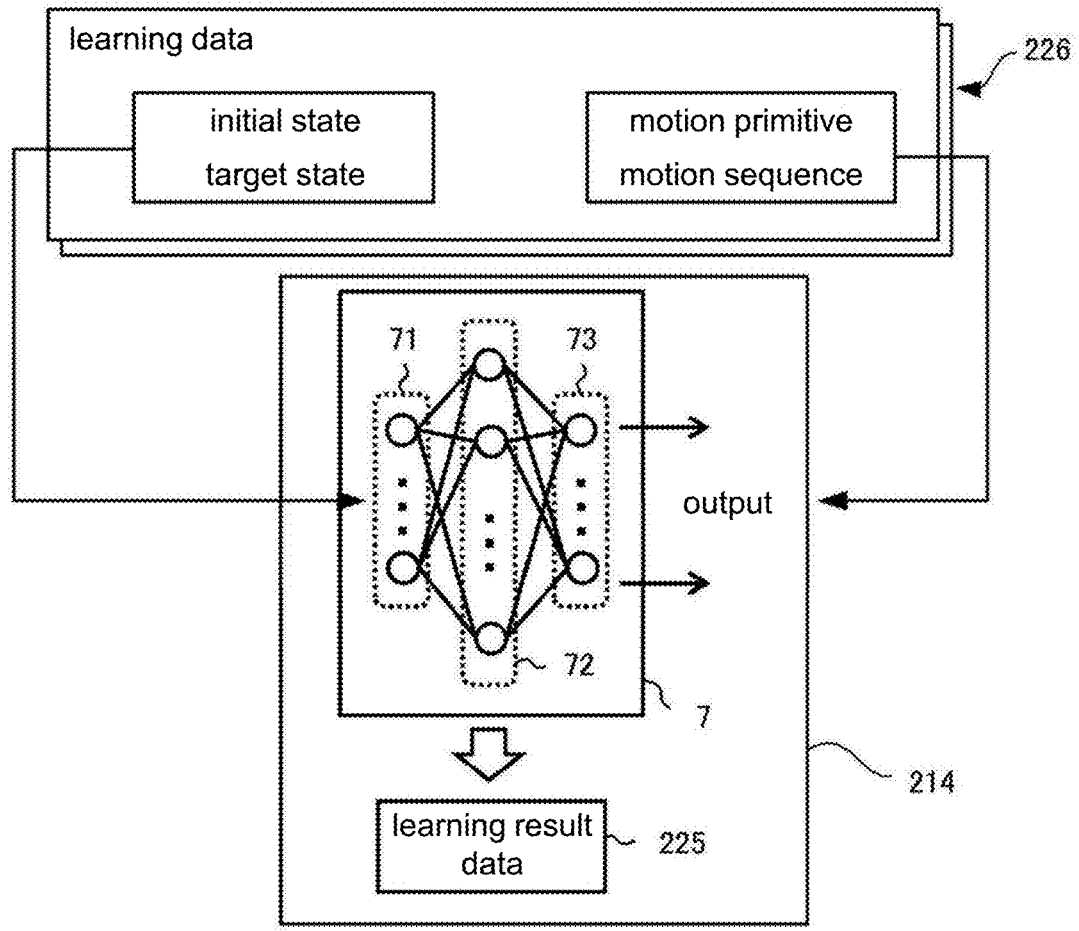
FIG. 11 is a diagram illustrating an example of learning of a learning machine of the control device illustrated in FIG. 1.

Learning of the first learning machine 214 is performed, for example, using learning data 226 which is illustrated in FIG. 11. That is, learning is performed by an error propagation method using learning data with an initial state and a target state as inputs and with motion primitives for an ideal motion and a motion sequence as outputs.

<2-2-3. Evaluation Part>

The evaluation part (command part) 212 evaluates the output of the motion determining part 211. For example, when a component cannot be completely moved to a target position by the motion primitives and the motion sequence output from the motion determining part 211, the robot 10 can be made to move according to the output of the motion determining part 211. However, as illustrated in FIG. 6, the component may not be completely moved to the target state depending on the motion primitives and the motion sequence output from the motion determining part 211. In this case, it is necessary to adjust the motion parameters.

Therefore, the evaluation part 212 determines whether the output of the motion determining part 211 is appropriate on the basis of a predetermined criterion and issues a command to the robot 10 such that the robot 10 moves according to the output of the motion determining part 211 when the criterion is satisfied. For example, the above-mentioned evaluation values can be used as the criterion and it can be determined that the criterion is satisfied when a difference between the evaluation value 1.0 and the output is within a predetermined range. On the other hand, when the predetermined criterion is not satisfied, the motion parameter determining part 213 determines optimal motion parameters. At this time, determination of the evaluation part 212 may be displayed on the display device 26 and a user may be made to determine whether to adjust the motion parameters.

The motion parameter determining part 213 includes a second learning machine 215, and an optimal motion parameter of each motion primitive is output from the second learning machine 215. Similarly to the first learning machine 214, the second learning machine 215 can be constituted by a neural network. Various types of input data can be input to the second learning machine 215. For example, the second learning machine 215 may use the initial state, the target state, the motion primitives output from the first learning machine 214, and the motion sequence as inputs and use the motion parameter of each motion primitive as an output. Alternatively, an evaluation value corresponding to the output of the first learning machine 214 may be additionally input. In this way, the input and the output are set and the motion parameter of each motion primitive which is optimal for achieving the target state is output.

The output motion parameters are sent to the evaluation part 212 and a motion command is issued to the robot 10 on the basis of the motion primitives of which the motion parameter has been changed and the motion sequence thereof.

<2-3. Operation of Control Device>

Figure 12:
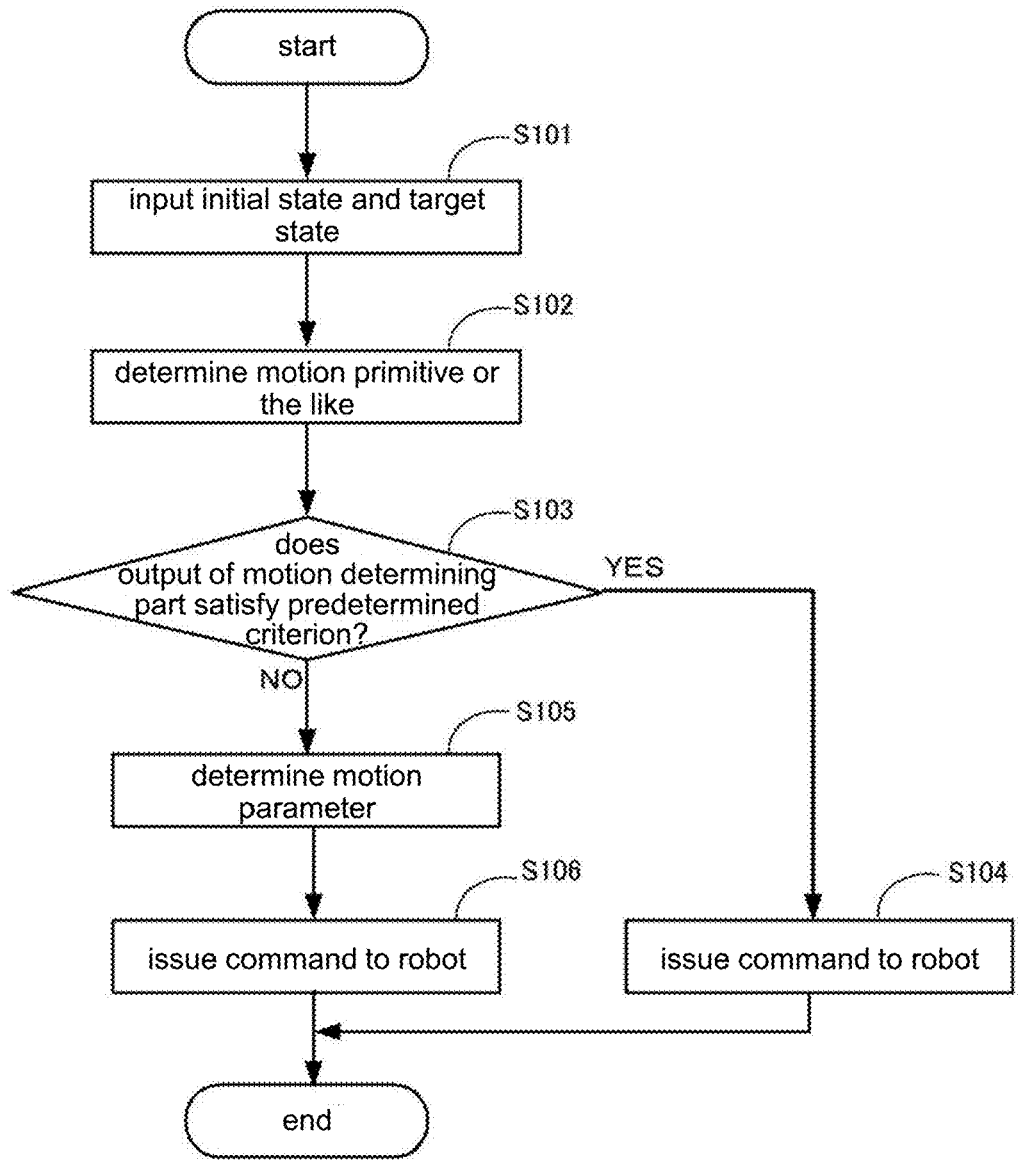
FIG. 12 is a flowchart illustrating an example of a control process flow of a robot which is performed by the control device illustrated in FIG. 1.

An example of a control process for a robot in the control device 2 will be described below with reference to FIG. 12. FIG. 12 is a flowchart illustrating an example of a process flow of the control device. The process flow which is described below is only an example and each process may be changed as much as possible. The process flow which will be described below can be appropriately subjected to omission, replacement, and addition of a step depending on embodiments.

As illustrated in FIG. 12, first, an initial state and a target state of a component are input from the input device 24 (Step S101). Accordingly, the motion determining part 211 outputs optimal motion primitives and a motion sequence according to the input (Step S102). Then, the evaluation part 212 determines whether the target state can be achieved using the motion primitives and the motion sequence output from the motion determining part 211 (Step S103). That is, it is determined whether the output of the motion determining part 211 satisfies the predetermined criterion. When the predetermined criterion is satisfied (YES in Step S103), a motion command is issued to the robot 10 on the basis of the output of the motion determining part 211 (Step S104). On the other hand, when the predetermined criterion is not satisfied (NO in Step S103), the motion parameters are adjusted. That is, the motion parameter determining part 213 determines optimal motion parameters (Step S105). Subsequently, the evaluation part 212 issues a motion command to the robot 10 on the basis of the motion primitives of which the motion parameter has been changed and the motion sequence thereof (Step S106).

<3. Features>

As described above, according to this embodiment, since an output for a motion of a robot is not acquired from all motions by the learning machine but the first learning machine 214 has been subjected to learning such that a predetermined number of motion primitives are prepared and optimal motion primitives and a sequence thereof are selected, it is possible to perform learning for a short time. Since the motion primitives are determined in advance, a user can easily understand a motion of a robot by watching a combination thereof.

When the target state cannot be achieved using even the motion primitives and the motion sequence which are determined by the motion determining part 211, the motion parameter of each motion primitive can be automatically determined by the motion parameter determining part 213. Accordingly, it is possible to improve accuracy for achieving a target position.

<4. Modified Examples>

While an embodiment of the present disclosure has been described above in detail, the above description is merely an example of the present disclosure in all respects. The embodiment can be subjected to various improvements or modifications without departing from the scope of the present disclosure. For example, the following modifications are possible. In the following description, the same elements as in the above embodiment will be referred to by the same reference signs and the same points as in the above embodiment will not be appropriately described. The following modified examples can be appropriately combined.

<1>

When the evaluation part determines that the output of the motion determining part does not satisfy a predetermined criterion, determination of the evaluation part 212 may be displayed on the display device 26 such that a user can determine a motion parameter. In this case, the user can directly input the motion parameter to the input device 24.

Accordingly, it is possible to cause the robot to perform a motion corresponding to a user's taste.

<2>

The motion parameter determining part 213 does not have to change the motion parameters of all the motion primitives but may change only the motion parameters of some motion primitives. For example, only the motion parameters of the motion primitives associated with one or more motions immediately before reaching the final position can be changed.

<3>

The motion parameters can be set within predetermined ranges, and the motion parameter determining part 213 may adjust the motion parameters within the ranges.

<4>

Figure 13:
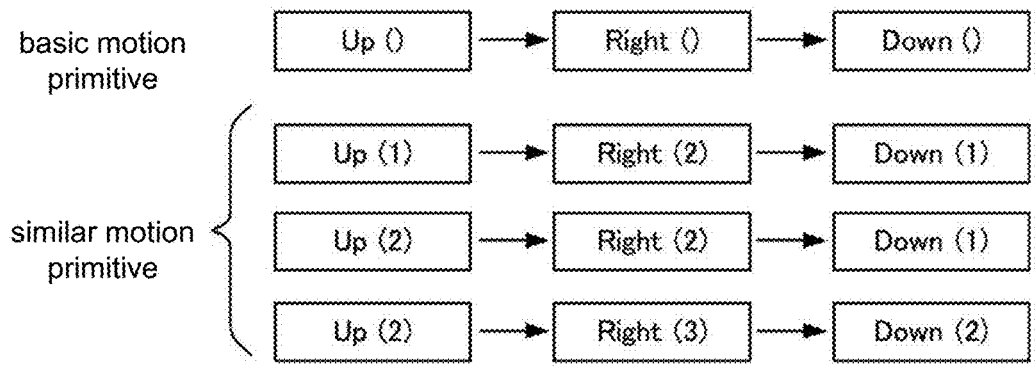
FIG. 13 is a diagram illustrating an example of another process flow which is performed by a motion determining part.

In the above embodiment, the motion determining part 211 determines motion primitives and a motion sequence thereof, but basic motion primitives and a motion sequence thereof may be known depending on work of the robot. In this case, for example, as illustrated in FIG. 13, optimal motion primitives may be determined out of motion primitives which have only a different motion parameter and which are similar to the basic motion primitives. In this case, as illustrated in FIG. 13, an input to a learning machine may be set to the same as in the above embodiment, but prepared motion primitives may be motion primitives which are different in only a motion parameter or may be motion primitives which are similarly in motion itself, and optimal motion primitives among them can be determined by the learning machine.

<5>

The motion primitives and the motion sequence described in the above embodiment are only an example and can be appropriately determined depending on the type of the robot or the type of work. For example, various settings such as rotation, grasp, pressing, and pulling can be appropriately set as the motion primitives depending on work which is performed by the robot. For example, when a robot with a multi-fingered hand perform assembly work, motion primitives such as "pressing" and "pulling" are set. The pressing is a motion of pressing the hand of the robot in a certain direction with a constant force and a motion parameter thereof is a pressing force. The pulling is a motion of moving the robot with fingers closed in a certain direction with a constant force and a motion parameter thereof is a pulling force. When the robot performs work of grasping a brush and writing a letter on a sheet of paper, motion primitives such as "pressing" of pressing the brush against the sheet of paper with a constant force, "movement" of moving forward, rearward, rightward, and leftward with the brush pressed, and "leaving" of slowly increasing the brush while moving the brush are set. By combining these motion primitives, a motion for reproducing a line width of a letter which is copied or an expression such as a "sweeping stroke" or a "jumping stroke" may be acquired.

<6>

In the above example, a general forward propagation neural network with a multilayered structure is used as the neural network 7. However, the type of the neural network 7 is not limited to the example and may be appropriately selected depending on embodiments. For example, the neural network 7 may be a convolutional neural network using the input layer 71 and the intermediate layer 72 as a convolutional layer and a pooling layer. For example, the neural network 7 may be a regression neural network having coupling of regressing from the output side to the input side such as from the intermediate layer 72 to the input layer 71. The number of layers of the neural network 7, the number of neurons of each layer, a coupling relationship between neurons, and a transfer function of each neuron may be appropriately determined depending on embodiments.

<7>

The learning machines 214 and 215 are examples of first and second processing parts in the claims, but the types thereof are not particularly limited and, for example, a support vector machine, a self-organizing map, or a learning machine that perform learning by reinforcement learning can be used instead of than a neural network. Alternatively, another means other than machine learning may be used and corresponds to the first processing part or the second processing part in the claims as long as it outputs motion primitives, a sequence thereof, and motion parameters.

Particularly, the motion parameter determining part 213 may determine the motion parameters using a genetic algorithm instead of the learning machine. An example thereof will be described below. First, entities are prepared by encoding motion parameters of motion primitives as genes. For example, the motion (2) in FIG. 5 may be prepared into an entity having a gene of (2, 2, 1). An initial group including a plurality of the entities is prepared and evaluation values of the entities are calculated. The evaluation values may be the same as the evaluation values illustrated in FIG. 6. Elimination of an entity, mating between entities, gene mutation, and the like are repeatedly performed on the group on the basis of the evaluation values, an entity having a highest evaluation value is selected from the group after several generations have passed, and motion parameters associated with the gene are set as the output of the motion parameter determining part 213. This outputting using the genetic algorithm corresponds to the processing part in the claims.

<8>

In the above embodiment, the control device 2 includes the motion determining part 211, the evaluation part 212, and the motion parameter determining part 213, but the control device according to the present disclosure may be constituted by the motion determining part 211 and the evaluation part 212. For example, when a plurality of motion primitives including a plurality of action sets are set, the motion parameter determining part 213 may not be provided. In this case, the evaluation part 212 does not evaluate the motion primitives and simply serves as a command part that issues a command to the robot 10.

<9>

The initial state (a first state) and the target state (a second state) represent states of a work object of the robot, but may represent states of the robot. The states of the robot may be directly used as an initial state and a target state for an input of a learning machine.

<10>

The control device according to the present disclosure can also be applied to another control or processing as well as a control device for a robot. That is, a first state of a processing object and a second state to which the first state transitions may be used as inputs and processes which are performed on the processing object for the transition may be selected out of a predetermined number of processes. This point is the same as the above-mentioned processing of the motion determining part 211. A process parameter of the selected process may be determined on the basis of a predetermined criterion through the same process as in the motion parameter determining part.

An example of such a process is an image process. For example, Gaussian filtering, binarization, and edge extracting can be used as the image processes (basic processes) corresponding to a motion primitive. Examples of a specific application object are as follows.

For example, when a computer tomography (CT) image is input, an application that converts the input image to an image in which only a part of a bone is displayed can be considered. When this process is automatically performed and a user writes a program, for example, a desired image is obtained by combining image processes of binarizing the image using a certain threshold value, applying an expansion and contraction process to the binarized image (whereby a fine area such as noise is cancelled), and taking a product (AND) of the image and the original image with the contraction and expansion process result as a mask. However, at this time, parameters such as the threshold value for the binarizing process, a filter size of the expansion and contract process (a so-called an opening process), and the number of times of contraction and expansion need to be appropriately adjusted. When this is intended to realize, a user having knowledge about image processes and programming needs to perform a trial and error operation of preparing a program and repeatedly adjusting parameters such that a desired process result is obtained. On the other hand, according to the present disclosure, it is possible to automatically determine an appropriate application sequence of image processing filters (basic processes) and parameters of the filters (process parameters).

The invention claimed is:

1. A control device for a robot that controls a motion of the robot, the control device for the robot comprising:
   a processor, configured to:
   set a first state of the robot and a second state to which the first state transitions as inputs of a first learning machine and set basic motions selected out of a predetermined number of prepared basic motions which are performed by the robot for transition from the first state to the second state and a motion sequence of the basic motions as outputs of the first learning machine, a predetermined first motion parameter being set for each of the basic motions;
   set the first state, the second state and the basic motions and the motion sequence output from the first learning machine as inputs of a second learning machine and set a second motion parameter of each of the basic motions selected as the outputs of the first learning machine for transition from the first state to the second state as outputs of the second learning machine; and
   adjust a current motion parameter of each of the basic motions for the robot and issue a motion command to the robot on the basis of the outputs from the first learning machine and the second learning machine,
   wherein the current motion parameter is for indicating aspect and degree of motions expressed by the basic motions.

2. The control device for the robot according to claim 1, wherein, when the robot is not able to transition to the second state using a predetermined criterion depending on the outputs from the first learning machine, the processor is configured to use the second motion parameter of the second learning machine to output as the current motion parameter for the robot.

3. The control device for the robot according to claim 2, wherein the current motion parameter is output within a predetermined range.

4. The control device for the robot according to claim 2, further comprising an input device configured to receive adjustment of the current motion parameter of each of the basic motions.

5. The control device for the robot according to claim 1, wherein the current motion parameter is output within a predetermined range.

6. The control device for the robot according to claim 1, further comprising an input device configured to receive adjustment of the current motion parameter of each of the basic motions.

7. The control device for the robot according to claim 1, wherein the input device is configured to receive designation of the second state.

8. A control system for a robot comprising:
   the robot; and
   the control device for the robot according to claim 1,
   wherein the robot transitions from the first state to the second state in accordance with the motion command from the control device.

9. A control method for a robot that controls a motion of the robot, the control method for the robot comprising steps as follows:
   preparing for a first learning machine to set a first state of the robot and a second state to which the first state transitions as inputs of the first learning machine and set basic motions selected out of a predetermined number of prepared basic motions which are performed by the robot for transition from the first state to the second state and a motion sequence of the basic motions as outputs of the first learning machine, a predetermined first motion parameter being set for each of the basic motions;
   preparing for a second learning machine to set the first state, the second state and the basic motions and the motion sequence output from the first learning machine as inputs of the second learning machine and set a second motion parameter of each of the basic motions selected as the outputs of the first learning machine for transition from the first state to the second state as outputs of the second learning machine;
   inputting the first state and the second state to the first learning machine and the second learning machine and outputting the basic motions and the motion sequence of the basic motions; and
   adjusting a current motion parameter of each of the basic motions for the robot and issuing a motion command to the robot on the basis of the outputs from the first learning machine and the second learning machine,
   wherein the current motion parameter is for indicating aspect and degree of motions expressed by the basic motions.

10. A non-transitory computer-readable storage medium storing a control program that controls a motion of a robot, the control program causing a computer to perform steps as follows:
   preparing for a first learning machine to set a first state of the robot and a second state to which the first state transitions as inputs of the first learning machine and set basic motions selected out of a predetermined number of prepared basic motions which are performed by the robot for transition from the first state to the second state and a motion sequence of the basic motions as outputs of the first learning machine, a predetermined first motion parameter being set for each of the basic motions;

preparing for a second learning machine to set the first state, the second state and the basic motions and the motion sequence output from the first learning machine as inputs of the second learning machine and set a second motion parameter of each of the basic motions selected as the outputs of the first learning machine for transition from the first state to the second state as outputs of the second learning machine;

inputting the first state and the second state to the first learning machine and the second learning machine and outputting the basic motions and the motion sequence of the basic motions; and adjusting a current motion parameter of each of the basic motions for the robot and issuing a motion command to the robot on the basis of the outputs from the first learning machine and the second learning machine, wherein the current motion parameter is for indicating aspect and degree of motions expressed by the basic motions.

11. A processing device that processes a processing object, the processing device comprising:

a processor, configured to:

set a first state of the processing object and a second state to which the first state transitions as inputs of a first learning machine and set basic processes selected out of a predetermined number of prepared basic processes which are performed on the processing object and a process sequence of the basic processes as outputs of the first learning machine for transition from the first state to the second state, a predetermined first process parameter being set for each of the basic processes;

set the first state, the second state and the basic processes and the process sequence output from the first learning machine as inputs of a second learning machine and set a second process parameter of each of the basic processes selected as the outputs of the first learning machine for transition from the first state to the second state as outputs of the second learning machine; and adjust a current process parameter of each of the basic processes for the processing object and perform processes on the processing object on the basis of the outputs from the first learning machine and the second learning machine, wherein the current process parameter is for indicating aspect and degree of processes expressed by the basic processes.

12. The processing device according to claim 11, wherein, when the processing object is not able to transition to the second state using a predetermined criterion depending on the outputs from the first learning machine, the processor is configured to use the second process parameter of the second learning machine to output as the current process parameter for the processing object.

13. The processing device according to claim 11, wherein the current process parameter is output within a predetermined range.

14. The processing device according to claim 11, wherein the process is an image process, the plurality of basic processes are filtering processes performed on an image.

* * * * *